United States Patent [19]

Jacoby

[11] Patent Number: 5,007,130
[45] Date of Patent: Apr. 16, 1991

[54] WIPER CLEANING SYSTEM

[76] Inventor: John J. Jacoby, 1919 Paper Mill Rd., Huntingdon Valley, Pa. 19006

[21] Appl. No.: 484,763

[22] Filed: Feb. 26, 1990

Related U.S. Application Data

[63] Continuation-in-part of Ser. No. 406,309, Sep. 12, 1989, Pat. No. 4,934,013.

[51] Int. Cl.[5] ............ A47L 25/00; B60J 1/20; B60S 1/62
[52] U.S. Cl. .............. 15/250 R; 15/250.19; 15/246; 296/96.15
[58] Field of Search ........ 15/250 R, 250.19, 246, 15/250.17, 250.16, 236.01, 236.08, 237; 296/96.15, 84.1

[56] References Cited

U.S. PATENT DOCUMENTS

| | | | |
|---|---|---|---|
| 2,310,945 | 2/1943 | Eisenberg | 15/250 R |
| 2,974,340 | 3/1961 | Kopczynski | 15/250 R |
| 3,546,825 | 12/1970 | Dale | 15/250 R |
| 3,613,318 | 10/1971 | Gianatasio | 15/250 R |
| 3,826,518 | 7/1974 | Hennig | 15/237 |
| 3,908,222 | 9/1975 | Scott | 15/250 R |
| 4,378,484 | 3/1983 | Kunert | 296/96.15 |
| 4,616,376 | 10/1986 | Paretskoi | 15/250 R |
| 4,685,168 | 8/1987 | Mastromoro | 15/250 R |

Primary Examiner—Harvey C. Hornsby
Assistant Examiner—Gary K. Graham

[57] ABSTRACT

A wiper cleaning system (2—2) for removing debris and other foreign matter from a wiper (11,12). The system comprises a plurality of discrete raised elements (23,24) spaced apart in two or more offsetting parallel rows (21,22) forming a brush like barricade in the path of the wiper. Variations are disclosed in which the elements are made integral with or are adhesively or otherwise secured to the windshield or other surface serviced by a wiper.

11 Claims, 1 Drawing Sheet

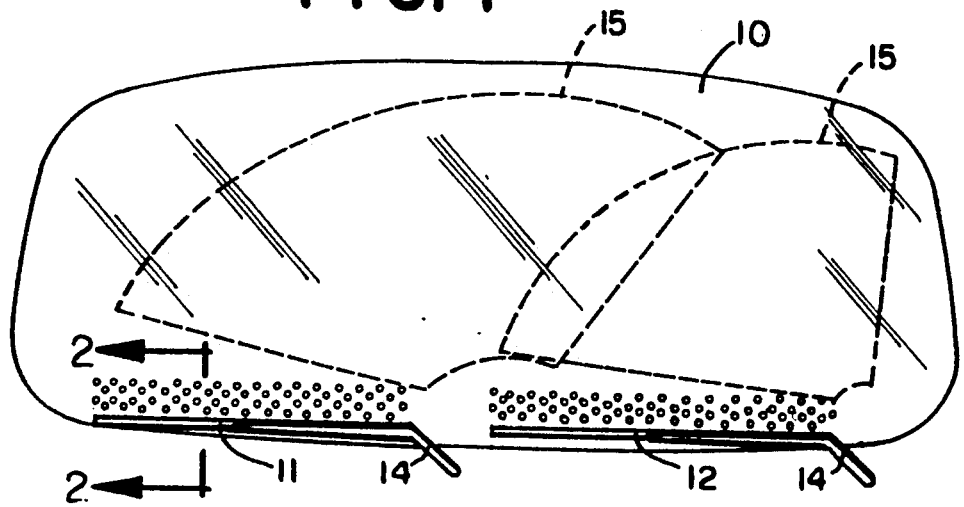
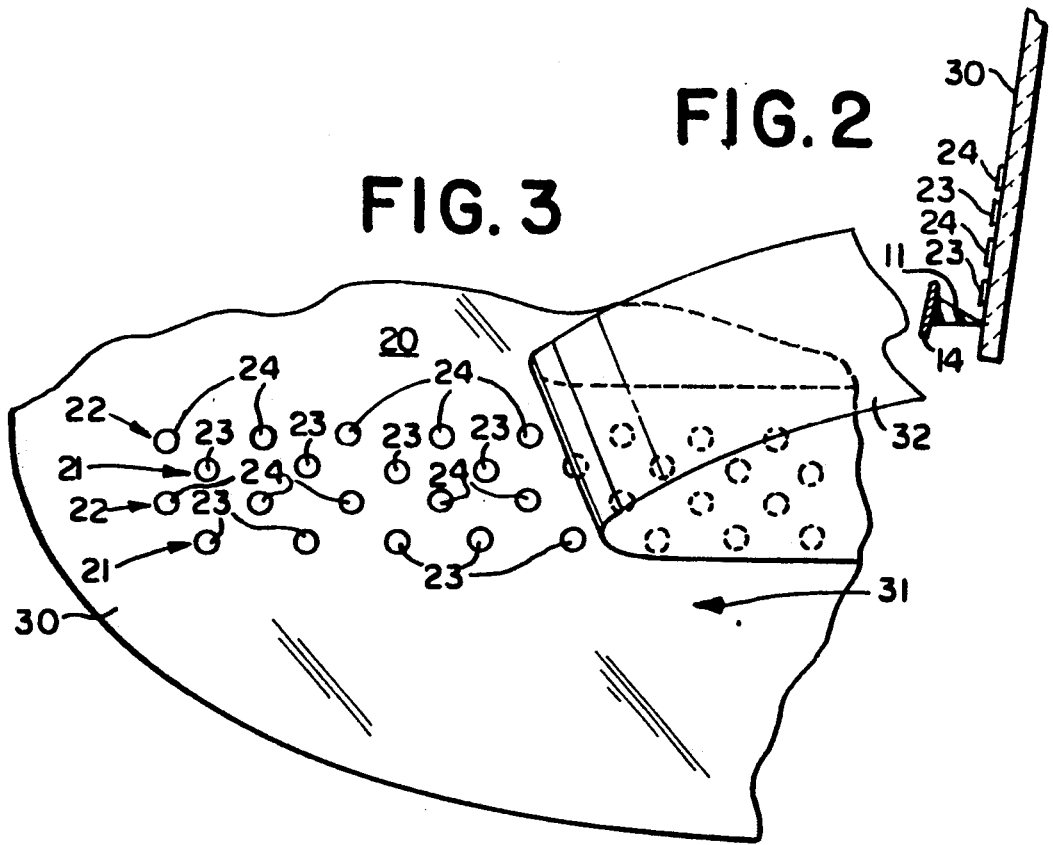

WIPER CLEANING SYSTEM

CROSS REFERENCE TO RELATED APPLICATIONS

The present application is a continuation-in-part of U.S. patent application Ser. No. 406,309 filed Sept. 12, 1989, now U.S. Pat. No. 4,934,013.

BACKGROUND OF THE INVENTION

1. Field of the Invention

This invention relates to a wiper cleaning system for windshields and other surfaces serviced by wipers in which the wiper is cleaned as it passes over discrete raised elements manufactured into or added onto the surface serviced by the wiper.

2. Description of Prior Art

The need to improve vision through windshields and other surfaces serviced by wipers by cleaning the wipers to prevent streaking and smearing has been long standing.

Wipers collect, carry and trap roadway debris and other foreign matter which impairs visibility while causing wear and damage to both the windshield and the wiper, imperatives together which demand that the wiper be cleaned manually, often under less than safe or desirable conditions. Various prior art structures have been proposed and examples of such prior art are disclosed in the U.S. patents to Collins, U.S. Pat. No. 1,017,081; Eisenberg, U.S. Pat. No. 2,310,945; Kopczynski, U.S. Pat. No. 2,974,340; Treacy, U.S. Pat. No. 3,124,811; Heuser, U.S. Pat. No. 3,315,387; Dale, U.S. Pat. No. 3,546,825; Gianatasio, U.S. Pat. No. 3,613,318; Hennig, U.S. Pat. No. 3,826,518; Scott, U.S. Pat. No. 3,908,222; Kollsman, U.S. Pat. No. 3,999,224; Krasborn, et al., U.S. Pat. No. 4,373,130; Cox, U.S. Pat. No. 4,425,677; Erlich, U.S. Pat. No. 4,479,319; Paretskoi, U.S. Pat. No. 4,616,376; Mastromoro, U.S. Pat. No. 4,685,168; Aainsworth, U.S. Pat. No. 4,293,975; Fasolino, U.S. Pat. No. 4,505,001; Finland Pat. No. 50,229; Kunert, No. RE 32,318; German Pat. No. 2,457,889; British Pat. No. 1,512,327; and Swiss Pat. No. 638,443, but none of them provided an entirely satisfactory solution.

In my prior application, Ser. No. 07/406,309, a filed Sept. 12, 1989, now U.S. Pat. No. 4,934,013 a clearing field is disclosed which includes two sets of lines on a windshield which are inclined at an angle to the path of the wiper and are generally perpendicular to each other. While the device provides a satisfactory arrangement, for some applications the system of the present invention has been found to possess certain advantages not found in other structures.

SUMMARY OF THE INVENTION

The system illustrated and described herein comprises a plurality of discrete raised elements spaced apart in an occluded manner in two or more offsetting, parallel rows forming a brush like barricade in the path of the wiper which removes foreign matter from the wiper. The raised elements are either manufactured into the surface to be wiped during its construction as illustrated in the embodiment of FIG. 1 or can be adhesively attached or bonded to said surface by the manner illustrated in FIG. 3. The elements of each row should be at least partly aligned with the spaces between the elements of the adjacent row to provide complete coverage of the entire length of the wiper creating lateral wiper clearing channels with serrated sides which, in addition to the other passageways provided, promotes defrosting and drainage.

OBJECTS AND ADVANTAGES

Accordingly my invention has many objectives, the foremost of which is to improve visibility through windshields and other surfaces serviced by wipers by cleaning the wipers on the windshield as the wipers are operated to prevent streaking and smearing to clear the field of vision and to do so in a simple, straight forward manner that is universally applicable and inexpensive.

Further, it uses no energy and needs no chemicals and will work wet or dry, depending upon the debris. My invention is maintenance free and provides passageways for drainage and can be formed integrally into the windshield during its construction or superimposed by means of an after market application strip, which is inexpensive and easy for anyone to apply, needing no tools. It is durable but removable and can be replaced.

Other objects and advantages of my invention will become apparent from a consideration of the drawings and ensuing description of it.

For purposes of illustration and description only, this invention will be described with reference to windshield wipers, without limiting other uses of the invention.

BRIEF DESCRIPTION OF THE DRAWING FIGURES

Illustrated are forms presently preferred; however, it being understood that this invention is not limited to the precise arrangements and instrumentalities shown.

FIG. 1 illustrates a front elevational view of an automobile windshield incorporating the system of my invention formed integrally with the windshield or as it appears after having been adhesively or otherwise bonded to the windshield.

FIG. 2 illustrates a cross sectional view of the system taken approximately on lines 2—2 of FIG. 1 which shows rows of elements separated by serrated lateral wiper clearing channels.

FIG. 3 illustrates an enlarged view of the system wherein the discrete raised elements are adhesively attached to the windshield, taken approximately on lines 2—2 of FIG. 1.

Reference Numerals in Drawings

10: windshield
11,12: wipers
14: wiper arms
15: patterns
20: wiper cleaning system
21,22: rows of elements
23,24: individual elements
30: element material
31: adhesive coating
32: application strip

DESCRIPTION OF THE PREFERRED EMBODIMENT

Referring now more particularly to the drawings an automotive windshield 10 is illustrated of well known type. A pair of wiper blades 11 and 12 are illustrated also of well known type fastened to wiper arms 14 which are connected to a wiper motor (not shown).

The arcuate sweep patterns of the wiper blades 11 and 12 are illustrated by the dotted lines 15 and are typical of such patterns. As used herein the term "wiper" refers to the wiper blades which contact the windshield, window or other surface which is wiped by the wiper.

The wiper cleaning system of the present invention is illustrated in FIGS. 1-3. FIG. 1 illustrates the wiper cleaning system made integrally with the windshield and is called a clearing field. The elements formed integrally in the windshield during its manufacture may be of the same shape and in the same alignment and orientation as described with respect to those adhesively or otherwise applied to an existing windshield.

FIG. 1 also illustrates the system as a clearing field, but in this variation the clearing field has been pressure sensitive adhesively applied or otherwise bonded by transfer application from a prepared strip called an application strip (32) to an existing windshield rather than incorporated into the windshield during its construction.

In the embodiment of FIG. 1 the wiper cleaning system (20) comprises a plurality of discrete elements raised from the windshield just above the wipers in their parked position spaced apart from one another and arranged in four rows, one row offset from the other to form a brush like barricade to clean the entire length of the wiper.

The discrete raised elements of the wiper cleaning system should be hard and durable and may be of any shape which will be effective in cleaning the wiping edge of a windshield wiper blade. To be effective, the raised elements should cause a wiper blade brushing or wiping action, together with a flexing action, on the wiper as the wipers pass over and contact the raised elements. The raised elements are spaced from each other by a distance such that oxidation and other foreign matter can be cleaned from substantially the entire length of the wiper by the system and such that the material so removed can channel between and be easily removed from the system.

The wiper cleaning system illustrated in FIGS. 1, 2 and 3 is grouped in four rows which are in staggered generally vertical alignment at least partially aligned with the spaces between the elements of the adjacent row(s).

The system of the invention requires at least two rows 21 and 22 of discrete raised elements 23 and 24 of which two pairs of such rows are illustrated. In the preferred embodiment two pairs of rows 21 and 22 have proven satisfactory in experiments conducted for debris removal. The elements 23 of rows 21 are in vertical alignment and the rows 22 of elements 24 are spaced there between also in vertical alignment.

The elements 23 and 24 of rows 21 and 22 are also in horizontal alignment which provide lateral wiper clearing channels with serrated sides between rows which promote drainage while resisting the accumulation of debris, and other attaching matter including ice and snow. In the preferred embodiment, the elements may have any appropriate diameter sufficient to provide effective cleaning of a wiper. However, it is preferred that the elements have a diameter of about 1.5 to about 4.5 mm and more preferably, about 3 mm.

Also, the elements may have any appropriate thickness or height which is sufficient to provide effective cleaning of a windshield wiper blade. However, it is preferred that the elements be made of plastic and have a thickness in the range of about 0.05 mm to about 0.50 mm, and more preferably about 0.10.

With each group or row, the elements preferably should have a generally horizontal spacing in the range of about 3.0 mm to about 9.0 mm and more preferably about 6.0 mm.

The preferred center to center generally vertical spacing is in the range of about 3.0 to about 7.0 mm, and more preferably, about 5.0 mm.

The present wiper cleaning system may be of any appropriate size sufficient to clean en entire wiper blade with each passage of the wiper over the system and have a plan surface area equal to the plan surface area of the wiper.

If the elements are not integrally formed into the windshield during its manufacture the invention may be manufactured for application to an existing windshield by any manner known in the art; however, one preferred material is Scotch cap Y-7735FL clear acrylic film coated with a clear ultraviolet resistant acrylic pressure sensitive adhesive by 3M Company. Other appropriate materials which may be used in the present invention will be evident to one skilled in the art based upon the present disclosure.

Prototypes and other testing models are hand made by formatting the adhesive side of removable drafting tape with the layout for the reverse application of the clearing field which is comprised of discrete raised elements which may be in the form of circular projections. These elements can be die cut by hand punch from pressure sensitive adhesive sheeting material from which the backing sheet has been removed and saved to protect the assembled elements when formatted to create the assembly for application called a clean sweep strip.

The clearing field is applied onto a clean surface such as a windshield by a simple installation process. The backing sheet is removed to expose the adhesive coated clearing field elements. The assembly is then carefully positioned in the desired location and attached to the windshield by pressing the assembly with the adhesive surface against the windshield with fingertip pressure to superimpose the clearing field onto the windshield. The format tape is then removed to complete the procedure. Thus applied, the clearing field can be removed and replaced with another if so desired.

The preferred location for application to an existing windshield is substantially the same as the manufactured into embodiment, which is slightly above the wipers in the off or parked position. In this position, the clearing field is below the arcuate sweep pattern of the wipers to cause the wipers to pass over the clearing field to be cleaned prior to and at the end of each wiping session. Moreover, such an embodiment allows the cleaning system to be placed in a location which will not interfere with the operator's field of vision. While the clearing field promotes passageways for drainage in any position, this relatively horizontal position situated as described interacts favorable with the defrost system while at least partially filtering harmful radiation from the sun on the top of the instrument panel.

SUMMARY, RAMIFICATIONS AND SCOPE

The product of my invention has many advantages in addition to improving visibility through windshields and other surfaces serviced by wipers by cleaning the wipers on the windshield whenever the wipers are turned on, automatically.

Today's windshields and wipers are bigger and better and more expensive than ever before and will be even bigger in the future. The need for a wiper cleaning system to improve the performance of all wipers on all windshields is greater now, too, and will continue to grow as the glass area grows to demand more clear, unimpaired visibility.

This invention takes on this challenge in a simple, straightforward, effective and attractive manner that is universally applicable while using no energy or chemicals and requiring no maintenance. As a feature formed into the glass during its manufacture, it is most durable and as an aftermarket application strip it is inexpensive and easy for anyone to apply to an existing windshield without tools and although it is durable, it is also removable and can be replaced.

Other applications that can benefit from a clean sweep strip applied onto or a clearing field manufactured into windows includes aircraft, marinecraft, locomotives, control towers, farming, plant or military equipment, security surveillance cameras, architectural glass and any other surface serviced by a wiper.

Although the description above contains many specificities, these should not be construed as limiting the scope of the invention but as merely providing illustrations of some of the presently preferred embodiments of this invention.

For example, the raised circular elements can have color or different shapes, such as oval, trapezoidal, traingular, etc. and the arrangement can be varied, while the projection of the elements more or less, etc.

Thus the scope of the invention should be determined by the appended claims and their legal equivalents, rather than by the examples given.

I claim:

1. A wiper cleaning system for removing debris and other foreign matter from a wiper for a surface such as a windshield serviced by a wiper, said system comprising a plurality of discrete raised elements projecting from said surface, said elements being arranged in horizontally extending rows that are vertically spaced, said rows extending for a distance corresponding to the length of the wiper, said elements being arranged in parallel horizontal alignment in each row and in generally vertical alignment in alternate rows and in staggered alignment in adjacent rows, said elements being spaced from each other by a distance such that debris and other foreign matter removed from the wiper by the system can be channeled therebetween.

2. A wiper cleaning system as in claim 1, wherein the elements are raised, circular projections extending from the surface wiped by the wiper.

3. A wiper cleaning system as in claim 1 wherein serrated, lateral wiper clearing channels are created between adjacent horizontal rows of elements.

4. A wiper cleaning system as in claim 2 wherein the circular projections have a diameter of about 1.5 to 4.5 mm, a thickness of about 0.05 to about 0.50 mm, a center to center generally horizontal spacing of about 3 to 9 mm, a center to center generally vertical spacing of about 3.0 to about 7.0 mm.

5. A wiper cleaning system as in claim 1, wherein the raised elements are formed integrally with the surface wiped by the wiper.

6. A wiper cleaning system as in claim 1, wherein the raised elements are adhesively attached to the surface wiped by the wiper.

7. A wiper cleaning system as in claim 1, wherein the system has a plan surface area equal to a plan surface area of the wiper.

8. A wiper cleaning system as in claim 1, wherein the raised elements are made of a hard durable material.

9. A wiper cleaning system as in claim 8, wherein the material is plastic.

10. A wiper cleaning system as in claim 1, wherein a path service by the wiper includes an arcuate sweep pattern when the wiper is operating and a parked position below the arcuate sweep pattern when the wiper is not operating, and wherein the raised elements are located on the window within the arcurate sweep pattern.

11. A wiper cleaning system as in claim 1, wherein a path service by the wiper includes an arcuate sweep pattern when the wiper is operating and a parked position below the arcuate sweep pattern when the wiper is not operating, wherein the elements are located within the parked position.

* * * * *